(12) United States Patent
Kawakami et al.

(10) Patent No.: US 7,755,544 B2
(45) Date of Patent: Jul. 13, 2010

(54) METHOD FOR CORRECTING REFERENCE POSITION INFORMATION, SERVER SYSTEM, AND REFERENCE POSITION INFORMATION CORRECTING SYSTEM

(75) Inventors: Seiichi Kawakami, Tokyo (JP); Jun Sakamoto, Tokyo (JP)

(73) Assignee: Vodafone K. K., Tokyo (JP)

( * ) Notice: Subject to any disclaimer, the term of this patent is extended or adjusted under 35 U.S.C. 154(b) by 99 days.

(21) Appl. No.: 11/640,932

(22) Filed: Dec. 19, 2006

(65) Prior Publication Data

US 2007/0100549 A1 May 3, 2007

Related U.S. Application Data

(63) Continuation of application No. PCT/JP2005/015421, filed on Aug. 25, 2005.

(30) Foreign Application Priority Data

Aug. 26, 2004 (JP) ............................. 2004-246851

(51) Int. Cl.
*G01S 19/05* (2010.01)

(52) U.S. Cl. ................................. 342/357.15

(58) Field of Classification Search ............ 342/357.09, 342/357.1, 357.14, 357.145
See application file for complete search history.

(56) References Cited

U.S. PATENT DOCUMENTS

| | | | | | |
|---|---|---|---|---|---|
| 5,564,079 | A | * | 10/1996 | Olsson | 455/456.3 |
| 6,014,102 | A | * | 1/2000 | Mitzlaff et al. | 342/457 |
| 6,133,874 | A | * | 10/2000 | Krasner | 342/357.15 |
| 6,522,888 | B1 | * | 2/2003 | Garceran et al. | 455/456.3 |
| 6,720,915 | B2 | * | 4/2004 | Sheynblat | 342/357.05 |
| 6,865,395 | B2 | * | 3/2005 | Riley | 455/456.1 |
| 6,999,777 | B1 | * | 2/2006 | Ganesh | 455/456.1 |
| 7,123,928 | B2 | * | 10/2006 | Moeglein et al. | 455/456.3 |
| 7,262,731 | B2 | * | 8/2007 | Han | 342/357.02 |
| 2002/0175855 | A1 | * | 11/2002 | Richton et al. | 342/357.02 |
| 2003/0085837 | A1 | | 5/2003 | Abraham | |
| 2003/0125044 | A1 | * | 7/2003 | Deloach et al. | 455/456 |
| 2004/0044911 | A1 | | 3/2004 | Takada et al. | |

FOREIGN PATENT DOCUMENTS

| | | |
|---|---|---|
| JP | 2002-196063 | 7/2002 |
| JP | 2003-319438 | 11/2003 |
| JP | 2004-32376 | 1/2004 |
| JP | 2004-80125 | 3/2004 |
| JP | 2005-508502 | 3/2005 |
| WO | WO 03/040747 A2 | 5/2003 |

* cited by examiner

*Primary Examiner*—Gregory C Issing
(74) *Attorney, Agent, or Firm*—Kratz, Quintos & Hanson, LLP

(57) ABSTRACT

A method for correcting reference position information is provided. A reference position information correction judging section 62 of an assistance server 50 saves location information in a location information storage and saving section 65, and judges whether to perform a correction of reference position information. The location information corresponds to a location of a cellular phone 20 in a range cell 90. Next, a reference position information correcting section 63 calculates a corrected reference position 92 based on the location information for the range cell 90 stored in the location information storage and saving section 65. The corrected reference position 92 is sent to a database section 64 from the reference position information correcting section 63, and is set as the reference position information of the range cell 90.

6 Claims, 11 Drawing Sheets

METHOD FOR CORRECTING REFERENCE POSITION INFORMATION, SERVER SYSTEM, AND REFERENCE POSITION INFORMATION CORRECTING SYSTEM

RELATED APPLICATION

This is a continuation application of the international patent application No. PCT/JP2005/015421 filed with Application date: Aug. 25, 2005. The present application is based on, and claims priority from, J.P. Application 2004-246851, filed on Aug. 26, 2004, the disclosure of which is hereby incorporated by reference herein its entirety.

BACKGROUND OF THE INVENTION

The present invention relates to a method for correcting reference position information, a server system, and a reference position information correcting system, and in particular to a method for correcting reference position information in which, in a mobile communication, corrects a reference position information of a cell, which is an area in which a base station can perform a wireless communication with a mobile communication terminal, a server system in which the method for correcting reference position is used, and a reference position information correcting system which includes this server system.

BACKGROUND ART

To date, mobile communication terminals such as cellular phones have been used widely. There has been a remarkable improvement in function and performance of mobile communication terminals. Mobile communication terminals having a position measuring function which measures a current location of the mobile communication terminal, in addition to essential functions as a mobile communication terminal, such as a call function, have been making debut.

A general example of a position measuring in such mobile communication terminals is a position measuring in which, a GPS (Global Positioning System) satellite is used. An example of the GPS position measuring, an assisted GPS position measuring enabling capture of a GPS satellite signal without performing a search of the entire sky by the mobile communication terminal themselves, by acquiring the information for capturing a GPS satellite (the assistance information) signal from an assistance server being connected to a network, has been used practically (refer to Patent Literature 1).

The assistance server providing the assistance information acquires reference position information of a cell from an identifier (ID) of the cell in a range where a mobile communication terminal making a request for the information exists. The assistance server, then derives from the reference position information of the cell the assistance information, which includes the information for capturing a GPS satellite, and provides the assistance information to the mobile communication terminal.

Moreover, as a position measuring in which the GPS satellite is not used, a position measuring by a cell ID in which the reference position information of a cell in the range where the mobile communication terminal exists, is used as a current location of the mobile communication terminal. Although the position measuring by the cell ID does not have a high accuracy as the position measuring when the GPS satellite is used, since the position measuring is possible at a place where a data communication can be performed, even if it is a place where the GPS satellite signal cannot be captured, the position measuring by the cell ID is used as a supplementary position measuring function.

Patent Literature 1: Japanese Patent Application Laid-open Publication No. 2002-196063

SUMMARY OF THE INVENTION

As it has been mentioned above, in an assisted GPS position measuring, the assistance information is derived from the reference position information of a cell, and generally, the reference position information of that cell is set at a center of that cell. As a more concrete example, an intersection of a ground plane and a main beam direction of wireless radio waves which are derived from an antenna which is installed at a wireless base station, is set as a reference position.

However, in many cases, due to topographical reasons of an area where that cell from among a plurality of cells forms a service area, there is an inclination that, a person using a mobile communication terminal, or a person using the assisted GPS position measuring, is restricted to a certain place in the cell.

With assisted GPS position measuring, even in the same cell, since a position measuring time for a position measuring of a location becomes long in a case of performing the position measuring at a place that is away from the reference position of the cell, if the center of the cell is set at the reference position all the time even in such a case, an average position measuring time of the assisted GPS position measuring becomes long. Even in a position measuring by a cell ID, since the center of the cell is set at the reference position, in many of the cases, an actual location is not reflected in a position measuring result.

When a mobile communication terminal is capable of performing GPS position measuring for international roaming etc., such can be taken into consideration. However, in many cases, the reference position information of the cell of a new or foreign destination is not set, and finding out and setting the reference position information for all the cells of the destination of the international roaming, cannot be said to be realistic. Even for such cells for which the reference position information is not presently set, performing the assisted GPS position measuring is desired.

The present invention is made in view of above-mentioned circumstances, and it is an object of the present invention to provide a method for correcting reference position information which enables to shorten an average position measuring time of the assisted GPS position measuring, as well as to reduce average error in a location of the position measuring in which the cell ID is used.

Moreover, it is an object of the present invention to provide a server system which enables to shorten the average position measuring time of the assisted GPS position measuring as well as to reduce the average error in the location of the position measuring in which the cell ID is used, and a reference position information correcting system in which this server system is used.

The present invention is a method for correcting reference position information in which the reference position information of a cell, said cell being an area where a base station can perform a wireless communication with a mobile communication terminal, comprising steps of: storing location information at a place where the current location information of a mobile communication terminal is stored such that it is possible to identify a range cell, said range being a cell in a range where the mobile communication terminal exists; judging a reference position information correction such that a judgment of whether or not the reference position information of the range cell is to be corrected is made based on the current location information; and correcting the reference position information such that when a judgment at the step of judging the reference position information correction is affirmative, the reference position information of the range cell is corrected based on at least one current location information which is stored at the step of storing location information.

In the method for correcting reference position information of the present invention, at the step of storing the location information, the current location information of that mobile communication terminal is stored for each range cell. Moreover, at the step of judging the reference position information correction, a judgment of whether or not the reference position information of a cell in a range of which the mobile communication terminal exists, is corrected based on the current position information of the mobile communication terminal. Next, when the judgment at the step of judging the reference position information correction is affirmative, the reference position information of the range cell is corrected at the step of correcting the reference position information. In this case, the cell is an area where a wireless communication with a base station is possible in which the mobile communication terminal can directly perform the wireless communication. Moreover, the range cell is a cell in a range where the mobile communication terminal exists, and normally includes a current location of the current location information.

Consequently, by correcting the reference position information of the cell, based on the current location information of the mobile communication terminal, it is possible to let a location of the reference position information of the cell to be an average current location of the mobile communication terminal. As a result, it is possible to shorten an average position measuring time of an assisted GPS position measuring, and to reduce an average error in a location of a position measuring where a cell ID is used.

Moreover, in the method for correcting reference position information of the present invention, it is possible to make an arrangement such that, at the step of judging the reference position information correction, when the current location information for which a distance from a location of the reference position information of the range cell is not less than a predetermined distance, is acquired for a predetermined number of times, a judgment of correcting the reference position information of the range cell is made, and at the step of correcting the reference position information, the correction is made by a statistical method.

In this case, when the location information of the mobile communication terminal in the cell differs from the reference position information by not less than the predetermined distance for a predetermined number of times, a judgment of a correction to be performed is made, and that correction is performed by using a statistical method, based on the location information. Consequently, it is possible to let the location of the reference position information of the cell to be a statistically anticipated location, as a current location of the mobile communication terminal, and as a result of this, it is possible to shorten the average position measuring time of the assisted GPS position measuring, and to reduce the average error in the location of position measuring in which the cell ID is used.

Moreover, in the method for correcting reference position information of the present invention, it is possible to make an arrangement such that the step of judging the reference position information correction is performed by using the current location information for which an error is not more than a predetermined value. Consequently, it is possible to calculate highly accurate location information by using only the location information with a small error.

Moreover, in the method for correcting reference position information of the present invention, it is possible to make an arrangement such that at the step of judging the reference position information correction, when the reference position information of the range cell is not available, an affirmative judgment is made, and at the step of correcting the reference position information, a correction is made to let the current location information to be the reference position information of the range cell.

In this case, even when the reference position information of the cell is not set, it is possible to add the reference position information by using the location information of the mobile communication terminal. Furthermore, thereafter, by correcting the reference position information of the cell by using at least one current location information, it is possible for the location of the reference position information of the cell to be an average current location of the mobile communication terminal. As a result of this, it is possible to shorten the average position measuring time of the assisted GPS position measuring, and to reduce the average error in the location of the position measuring in which the cell ID is used.

Moreover, in the method for correcting reference position information of the present invention, the current location information can be a position measuring result of an assisted GPS position measuring that uses the assistance information, including the information for capturing a GPS satellite signal. Consequently, by using the result of the assisted GPS position measuring as the current location information, it is possible to let the location of the reference position information of the cell be the average current location of the mobile communication terminal that performs the assisted GPS position measuring. As a result of this, it is possible to shorten the average position measuring time of the assisted GPS position measuring.

A server system of the present invention comprises: a database which includes the reference position information of a cell which is in an area in which a base station can perform a wireless communication with a mobile communication terminal; a location information storage section which stores the current location information of a mobile communication terminal such that it is possible to identify a range cell which is a cell in a range of which the mobile communication terminal exists; a reference position information correction judging section that acquires the current location information, and makes a judgment of whether or not to correct the reference position information of the range cell, based on at least one current location information; and a reference position information correcting section that, when the reference position information correction judging section has made an affirmative judgment, corrects the reference position information of the range cell based on at least one current location information.

The database of this server system is a database which is capable of deriving reference position information of a cell from an ID (identifier) of that cell. Moreover, the location information storage section stores the location information of the mobile communication terminal for each cell. This location information storage section may be formed as one database by being combined with the database, or may exist as a separate saving section. The reference position information correction judging section acquires the current location information of the mobile communication terminal, and makes a judgment of whether or not to correct the reference position information of the cell, based on at least one current location information of the mobile communication terminal in that cell. The reference position information correcting section, when the reference position information correction judging section has made an affirmative judgment, corrects the reference position information of that cell, based on at least one current location information of the mobile communication terminal in that cell. In this case, the "server system" may be formed by a plurality of server units, or may be a single server unit.

Consequently, it is possible to let the location of the reference position information of the cell to be the average current location of the mobile communication terminal, by correcting the reference position information of the cell, based on the current location information of the mobile communication terminal. As a result of this, it is possible to shorten the average position measuring time of the assisted GPS position measuring, and to reduce the average error in the location of the position measuring in which the cell ID is used.

Moreover, in the server system of the present invention, it is possible to make an arrangement such that the database, when the reference position information of the range cell is not available, is formed such that reference position information of further wider area including the range cell, is referred to, and the reference position information correcting judging section makes an affirmative judgment when there is no reference position information of the range cell in the database, and the reference position information correcting section makes a correction such that the current location information is to be the reference position information of the range cell, when there is no reference position information of the range cell in the database.

In this case, when reference position information of a cell that is used for deriving the assistance information of the assisted GPS position measuring, or the reference position information of a cell which is used for a cell ID position measuring is not set in the database, the formation is such that the reference position information in further wider area is referred to. Consequently, even in a cell for which the reference position information of the cell is not set, it is possible to perform a position measuring which is in conformance with the assisted GPS position measuring or the cell ID position measuring. In this case, further wider area means an area which indicates RNC—ID (Radio Network Controller—ID), LAC (Location Area Code), MCC (Mobile Country Code), MNC (Mobile Network Code) in a 3GPP (3rd Generation Partnership Project) standard.

Furthermore, when the reference position information of the cell is not set in the database, it is possible to add the reference position information of the cell by acquiring the location information of the mobile communication terminal. Hereafter, it is possible to bring the location of the reference position information of the cell closer to the average current location of the mobile communication terminal, by correcting the reference position information, based on at least one current location information. As a result of this, it is possible to shorten the average position measuring time of the assisted GPS position measuring, and to reduce the average error in the location of the position measuring in which the cell ID is used.

Moreover, in the server system of the present invention, it is possible to let the server system to be an assistance server which provides the assistance information, including information for capturing a GPS satellite signal, to a mobile communication terminal which makes a request for acquiring the assistance information. In this case, it is possible to perform a process starting from acquiring the reference position information up to providing the assistance information by the same server system, and to use the location information that is acquired by the same server, as the assistance server, as it is, for correction judgment, and correction.

A reference position information correcting system of the present invention comprises: a mobile communication terminal; a network to which the mobile communication terminal is connected by using a wireless communication; and the server system of the present invention, which is connected to the network.

In this reference position information correcting system, since the server system of the present invention can be used, it is possible to bring the location of the reference position information of the cell closer to the average current location of the mobile communication terminal. As a result of this, it is possible to shorten the average position measuring time of the assisted GPS position measuring, and to reduce the average error in the location of the position measuring in which the cell ID is used.

As it has been described above, according to a method for correcting reference position information of the present invention, there is shown an effect that it is possible to shorten an average position measuring time of an assisted GPS position measuring, and to reduce an average error in a location of a position measuring in which a cell ID is used.

Moreover, there is shown an effect that a server system and a reference position information correcting system which includes the server system, of the present invention can shorten the average position measuring time of the assisted GPS position measuring, and reduce the average error in the location of the position measuring in which the cell ID is used.

DETAILED DESCRIPTION

Figure 1:
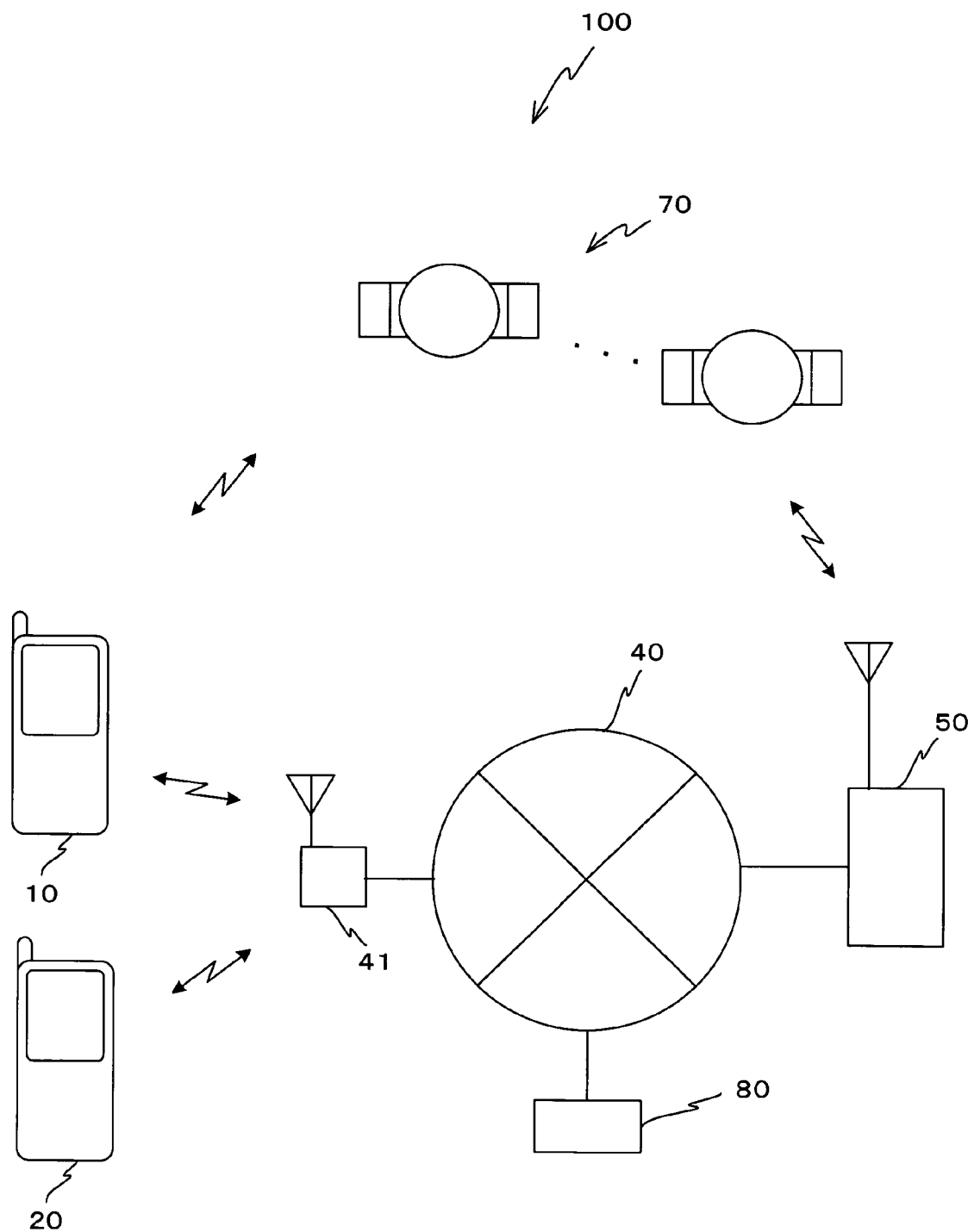
FIG. 1 is a diagram showing schematically a configuration of an assisted GPS position measuring system which is an embodiment which includes a reference position information correcting system of the present invention.

An embodiment of the present invention will be described below while referring to FIG. 1 to FIG. 9. In these diagrams, same reference numerals are assigned to the same or similar components, and the repeated description is omitted.

In FIG. 1, a configuration of an assisted GPS position measuring system 100 which is an embodiment which includes a reference position information correcting system of the present invention is shown schematically. As shown in FIG. 1, this assisted GPS position measuring system 100 includes (a) a cellular phone 10 which is a mobile communication terminal having a so-called MS-Assisted function, which does not perform a location calculation by its own, at the time of performing an assisted GPS position measuring, (b) a cellular phone 20 which is a mobile communication terminal having a so-called MS-based function, which performs a location calculation by its own, at the time of performing the assisted GPS position measuring, (c) a base station 41 which performs a wireless communication with the cellular phone 10 and the cellular phone 20, (d) a network 40 to which the base station 41 is connected, (e) an assistance server 50 connected to the network 40, which provides assistance information, (f) a terminal unit 80 which is connected to the same network 40, and makes a request for a location measuring to the cellular phone 20, and (g) a GPS satellite group 70 which is a group of GPS satellites which transmit radio waves for location observation to the cellular phones 10 and 20, and the assistance server 50 etc.

Figure 2A:
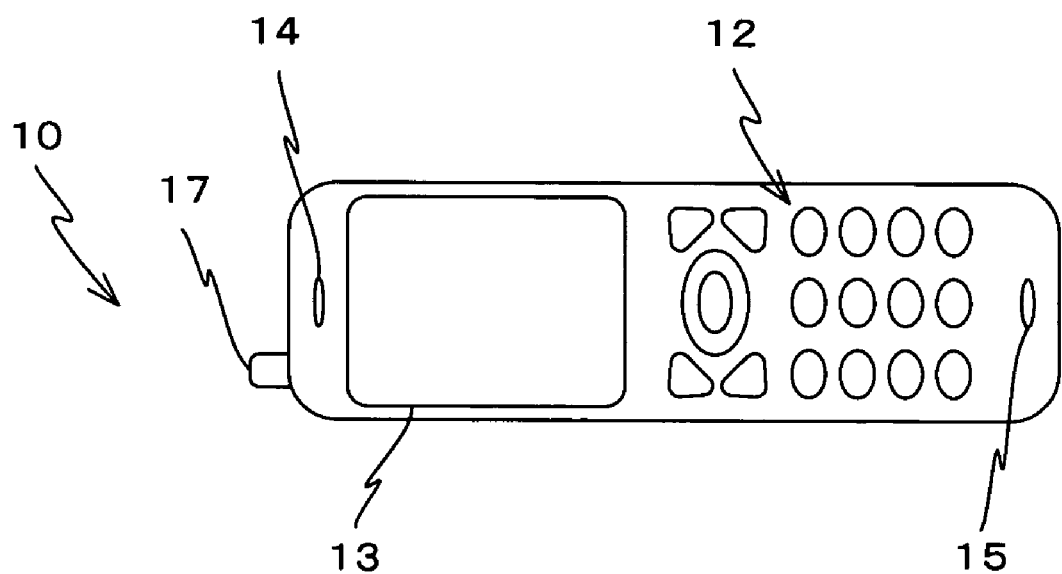
FIG. 2A is a front view showing schematically an external appearance of a cellular phone 10 in FIG. 1.
Figure 2B:
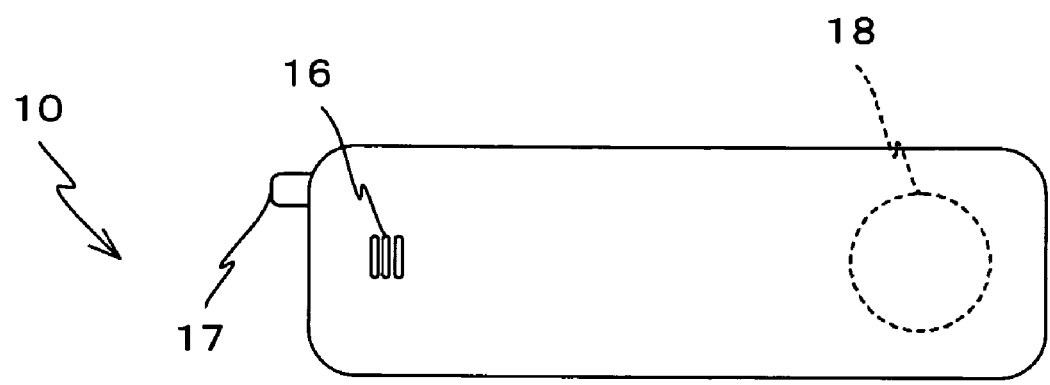
FIG. 2B is a rear view showing schematically the external appearance of the cellular phone 10 in FIG. 1.

In FIG. 2A and FIG. 2B, external appearance of the cellular phone 10 is shown schematically. As shown in FIG. 2A and FIG. 2B, the cellular phone 10 includes (a) an operating section 12 which includes a numerical keypad for inputting telephone numbers, and function keys for inputting various commands such as switching of an operation mode, (b) a display section 13 having a liquid crystal display which displays operation instructions, operation status, and messages received etc. of the cellular phone 10, (c) a speaker for conversation 14 which reproduces an aural signal transmitted from a communication counterpart during conversation, (d) a microphone 15 for inputting sound during listening, and inputting voice during conversation, (e) a speaker for instructions 16 for generating a sound informing an incoming call, and an instruction sound, (f) an antenna 17 for performing a wireless communication with the base station 41, and (g) a GPS receiving section 18 which performs a wireless communication with the GPS satellite group 70, inside the cellular phone 10.

The cellular phone 20 has an appearance similar to the appearance in FIG. 2A and FIG. 2B. However, as it was described in the configuration of the system in FIG. 1, the cellular phone 10 is the so-called MS-assisted type, in which, at the time of performing the assisted GPS position measuring, the cellular phone 10 does not perform the location calculation by its own, and the cellular phone 20 is the so-called MS-based type, in which, at the time of performing the assisted GPS position measuring, the cellular phone 20 performs the location calculation by its own.

Figure 3:
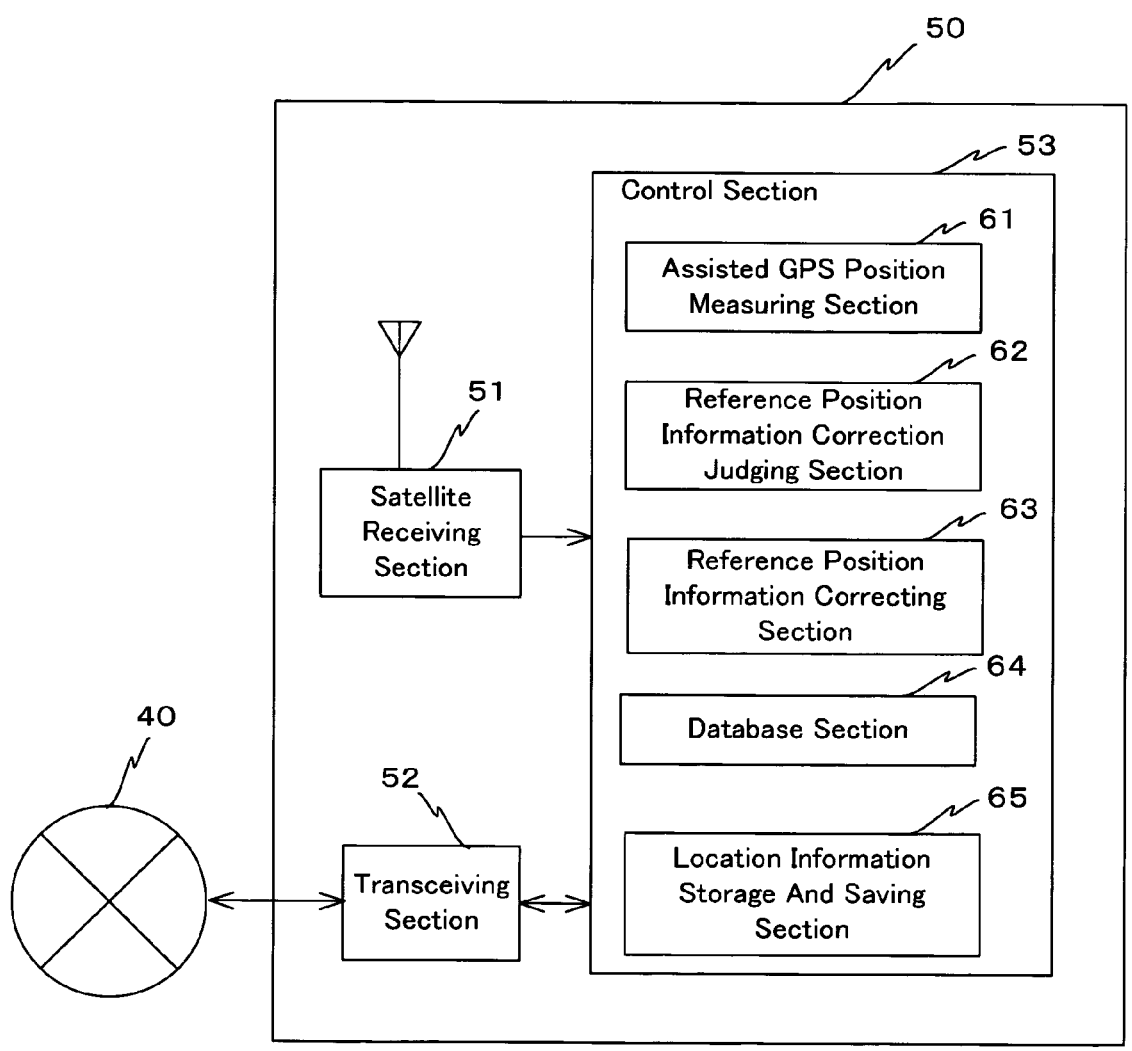
FIG. 3 is a diagram showing schematically an internal configuration of an assistance server 50 in FIG. 1.

In FIG. 3, an internal configuration of the assistance server 50 is shown schematically. The assistance server 50 includes a satellite receiving section 51 for receiving radio waves from a GPS satellite, a transceiving section 52 for performing a communication with the network 40, and a control section 53 for performing an integrated control of the entire assistance server 50.

In this embodiment, the control section 53 includes (i) an assisted GPS position measuring section 61 which analyzes a signal of a GPS satellite which is notified from the satellite receiving section 51, then derives the assistance information, and provides it to the cellular phones 10 and 20, as well as acquires GPS observation information and location information from the cellular phones 10 and 20 respectively, and calculates the location information for the cellular phone 10, (ii) a reference position information correction judging section 62 which acquires the location information, and makes a judgment of whether or not to correct reference position information of a cell, (iii) a reference position information correcting section 63 which corrects the reference position information of the cell when the reference position information correction judging section 62 has made an affirmative judgment, (iv) a database section 64 which performs management of data of the reference position information and an ID of cell, and (v) a location information storage and saving section 65 which saves and stores the location information which is acquired by the reference position information correction judging section 62.

In this embodiment, when an error in a location information acquired is 100 m or less, and a distance between the location information acquired and the reference position information of the cell is 300 m or more, the reference position information correction judging section 62 adds one to a correction judging counter, and when the correction judging counter reaches 10, it is let to perform a judgment that the correction has to be performed. Moreover, the location information storage and saving section 65 is let to be a storage section of a so-called FIFO (First In First Out) in which 100 location information are stored in each cell, and for a cell for which the number of information is more than 100, the location information are deleted in order of the oldest information first.

Figure 4A:
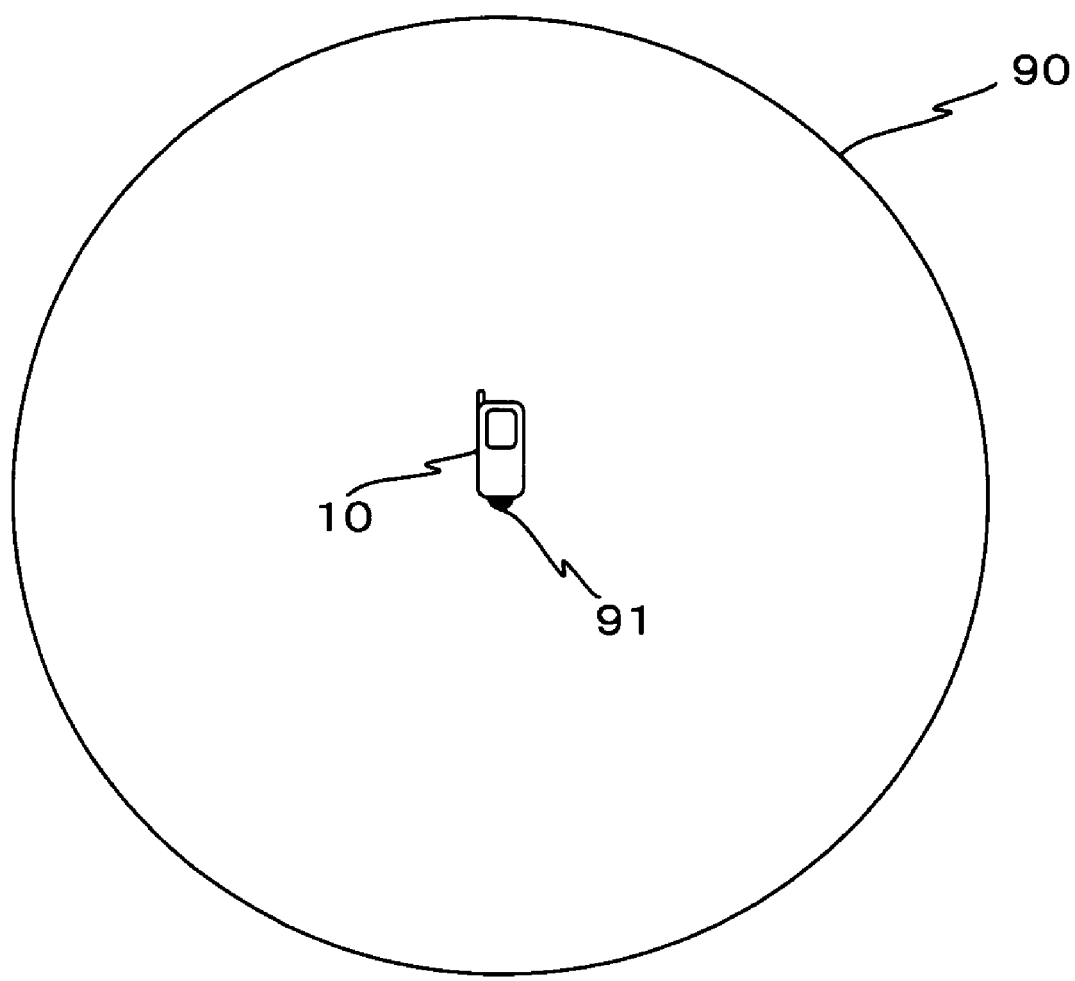
FIG. 4A is a diagram showing schematically a cell in a range of which the cellular phone 10 in FIG. 1 exists, and a corrected reference position thereof.

Next, a method for correcting reference position information in the assisted GPS position measuring system 100 which is formed as described above, will be described. Moreover, the reference position information of a cell 90 is not initially set in the database section 64, and as shown in FIG. 4A, the cellular phone 10 is let to be in a range of the cell 90.

Figure 5:
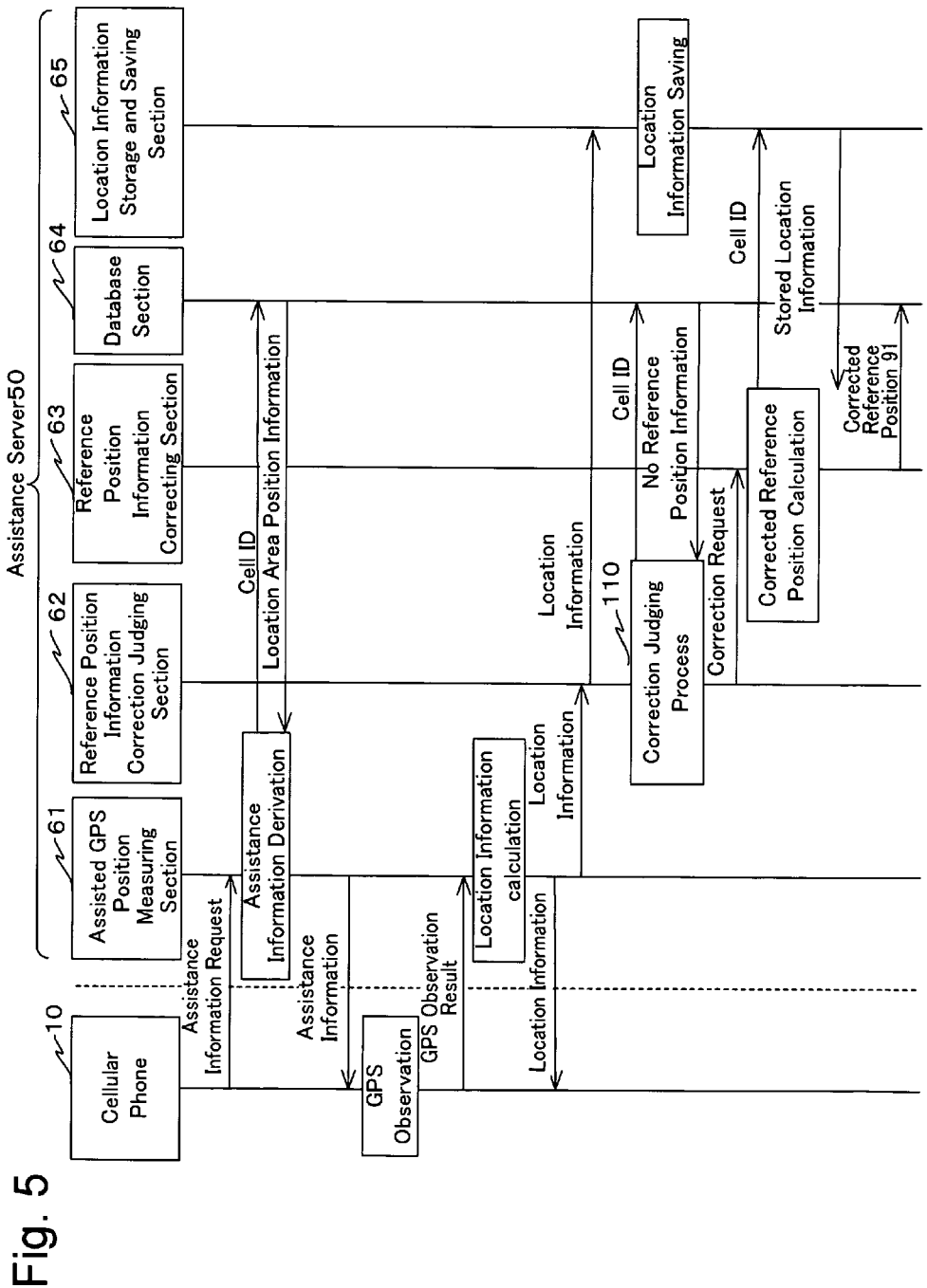
FIG. 5 is a sequence diagram for describing a method for correcting reference position information when reference position information is not set in a cell.

As shown in FIG. 5, the cellular phone 10 begins by making a request for the assistance information, to the assistance server 50 via the base station 41 and the network 40. This request for the assistance information includes information such as a cell ID of the cell 90 in a range where the cellular phone 10 exists.

The assisted GPS position measuring section 61 of the assistance server 50 receives the assistance information request via the transceiving section 52, and makes a query for reference position information of a cell to the database section 64, with the cell ID of the cell 90 in a range of which the cellular phone 10 exists, as a parameter. When the database section 64 which has received the query, confirms that reference position information corresponding to the cell ID of the cell 90 is not set, location information of a location area having a wide area including the cell 90, is transmitted as a response to the assisted GPS position measuring section 61.

The assisted GPS position measuring section 61 which has received the location information of the location area of the cellular phone 10, derives the assistance information from this information, and transmits the assistance information to the cellular phone 10 via the transceiving section 52, the network 40 and the base station 41. The cellular phone 10 having received the assistance information performs observation of the radio waves of a GPS satellite by using the assistance information, and transmits an observation result to the assistance server 50 via the base station 41 and the network 40.

The assisted GPS position measuring section 61 of the assistance server 50 receives the GPS observation result via the transceiving section 52, and calculates the location information of the cellular phone 10. The location information that was calculated is transmitted to the cellular phone 10 via the transceiving section 52, the network 40, and the base station 41, and is notified to the reference position information correction judging section 62. The cellular phone 10 receives the location information being transmitted, and provides it to a user as a location information service. On the other hand, the reference position information correction judging section 62 to which the location information is notified, further notifies the location information to the location information storage section 65, and the location information storage section 65 which has received the notification, saves the location information. Hereafter, the reference position information correction judging section 62 performs a correction judging process 110.

Figure 6:
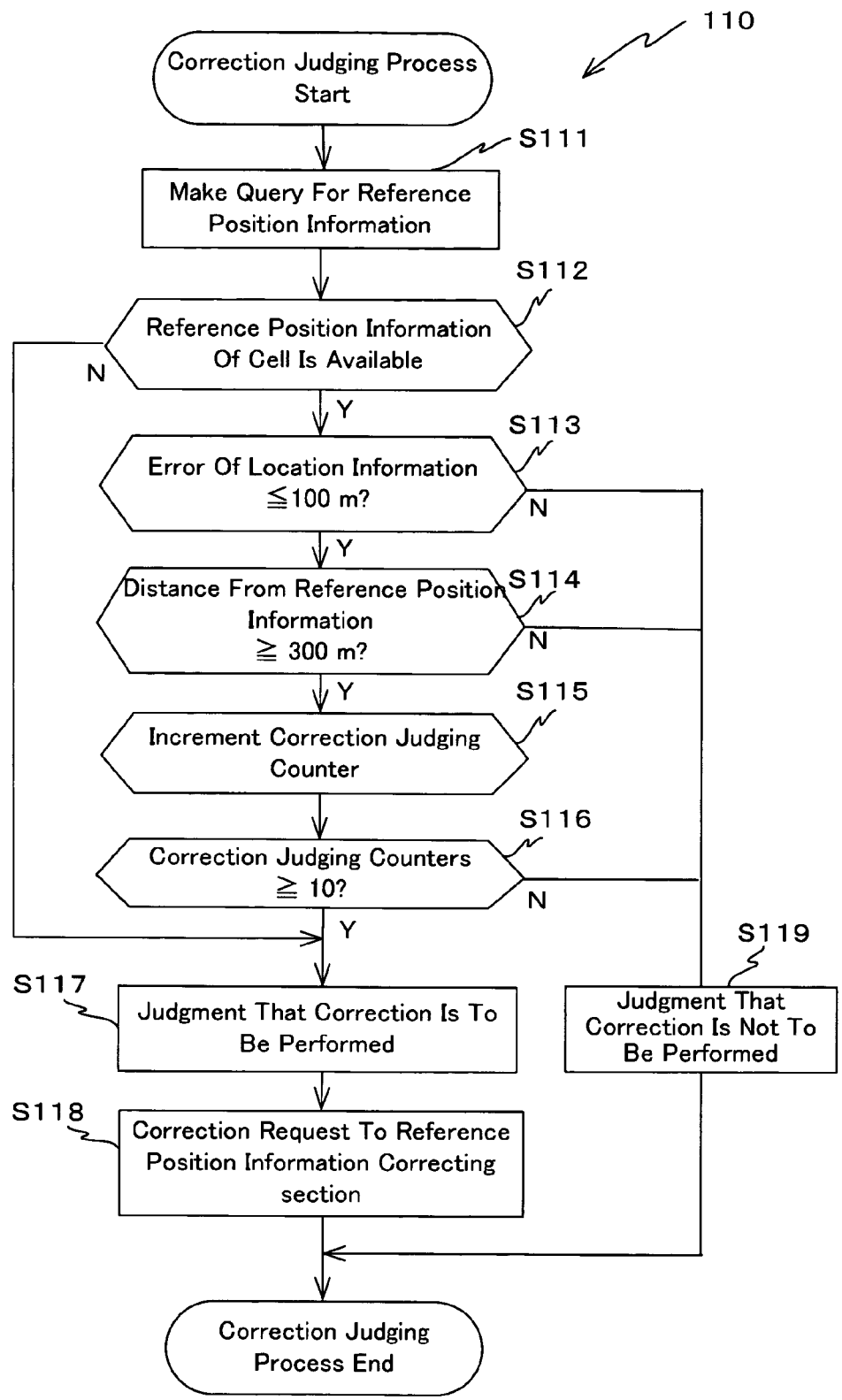
FIG. 6 is a flowchart showing a correction judging process.

In the correction judging process 110, as shown in FIG. 6, at step S111, with the cell ID of the cell 90 as a parameter, a query is made to the database section 64 for reference position information of the cell. The database section 64 gives a response that the reference position information corresponding to the cell ID of the cell 90 is not set. The reference position information correction judging section 62 which has received the response, at step S112, confirms that the reference position information of the cell is not available, and the process is advanced to step S117.

At step S117, a judgment that the reference position information has to be corrected is made, and next, at step S118, a request for correction is made to the reference position information correcting section 63. Coming back to FIG. 5, the reference position information correcting section 63 which has received the request for correction, acquires the location information which is stored, by passing the cell ID as a parameter, to the location information storage section 65. The stored location information, being only the location information of the cellular phone 10 previously saved, a corrected reference position 91 is let to be a position of the cellular phone 10 as shown in FIG. 4A. Information of the corrected reference position 91, as shown in FIG. 5, is notified to the database section 64, and is set as the reference position information of the cell 90.

Figure 4B:
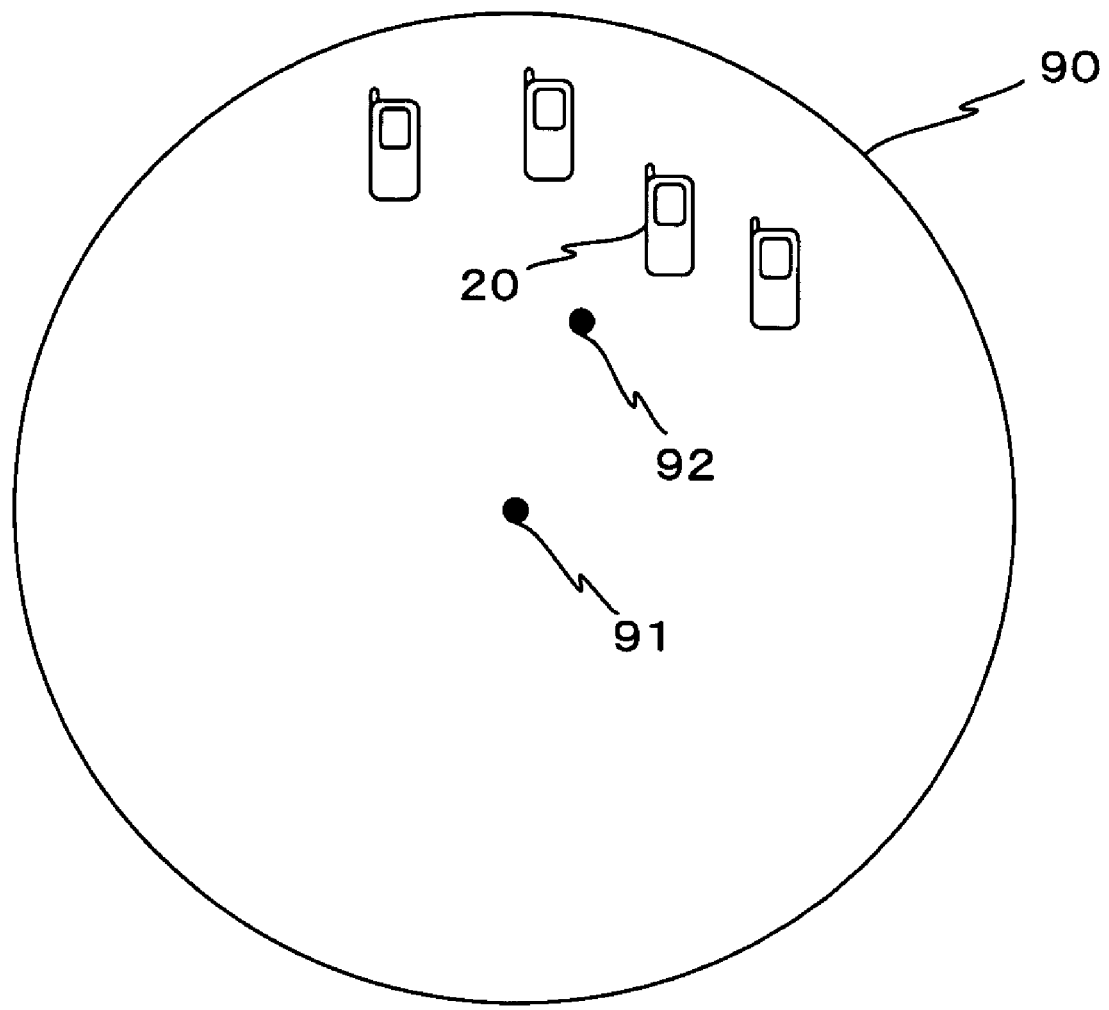
FIG. 4B is a diagram showing schematically a cell in a range of which a cellular phone 20 exists, and a corrected reference position thereof.

In the cell 90, thereafter, the assisted GPS position measuring by other mobile communication terminal is performed for a plurality of times, and moreover, the cellular phone 20, as shown in FIG. 4B, is let to be in the range of the cell 90.

Figure 7:
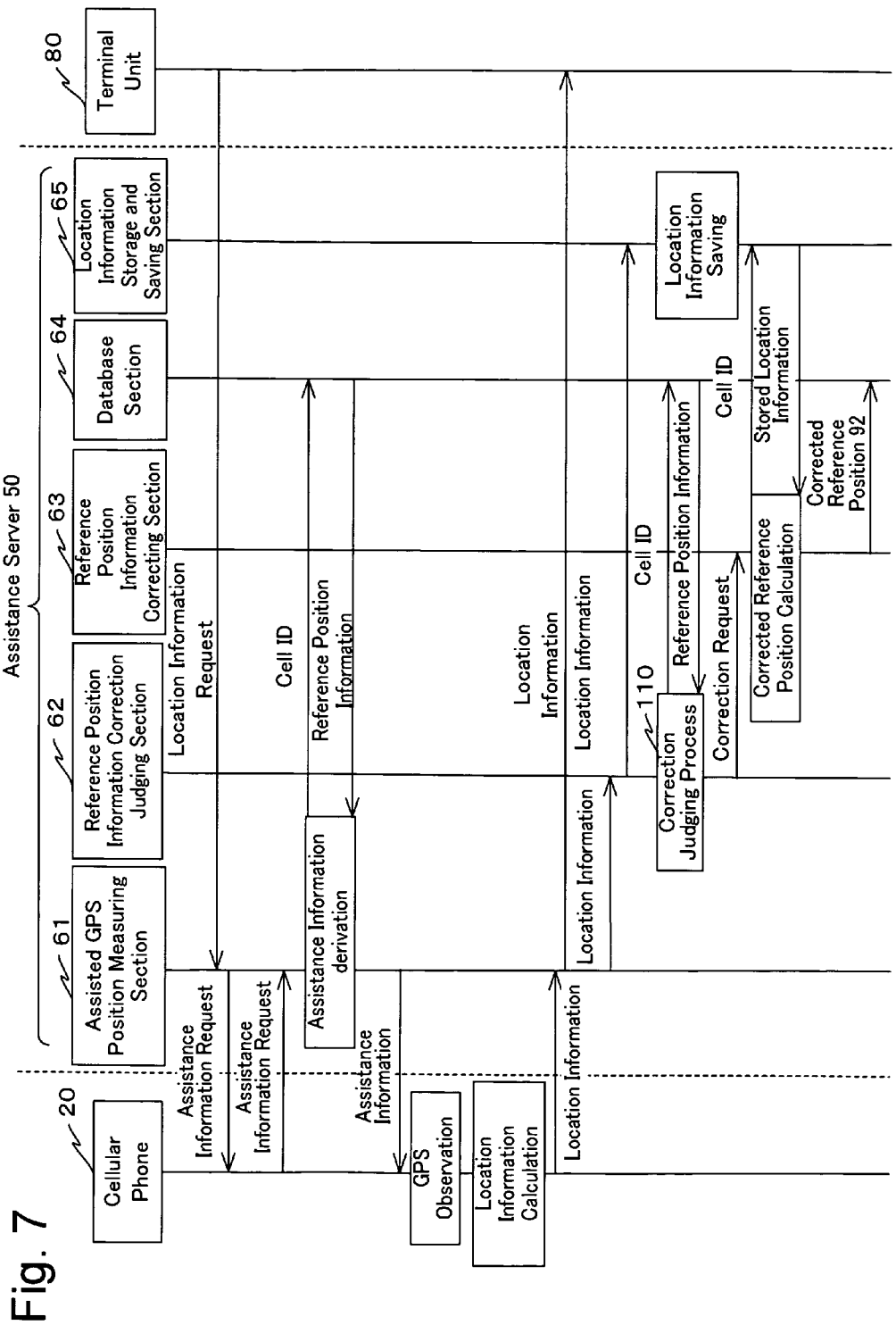
FIG. 7 is a sequence diagram for describing a method for correcting reference position information when the reference position information is set in the cell.

Next, as shown in FIG. 7, the terminal unit 80 makes a request for the location information of the cellular phone 20 to the assistance server 50 via the network 40. The assisted GPS position measuring section 61 of the assistance server 50 receives the request for the location information from the terminal unit 80 via the transceiving section 52, and further, makes a request for the location information to the cellular phone 20 via the transceiving section 52, the network, 40, and the base station 41. The cellular phone 20 having received the request for the location information via the antenna 17, makes a request for the assistance information, to the assistance server 50 via a similar route. This request for the assistance information, similarly as in FIG. 5, includes the information such as the cell ID of the cell 90 in a range of which the cellular phone 20 exists. The assisted GPS position measuring section 61 of the assistance server 50 which has received the assistance information request, makes a query for reference position information of a cell to the database section 64, with the cell ID of the cell 90 in the range of which the cellular phone 20 exists, as a parameter. The database section 64 which has received the query, gives in response the reference position information corresponding to the cell ID of the cell 90, to the assisted GPS position measuring section 61.

The assisted GPS position measuring section 61 which has received the reference position information of the cell 90 derives the assistance information from the reference position information and transmits the assistance information to the cellular phone 20 via the transceiving section 52, the network 40, and the base station 41. The cellular phone 20 having received the assistance information, performs an observation of radio waves of a GPS satellite by using this assistance information, and then, calculates the location information from an observation result. Further, the cellular phone 20 transmits the calculated location information, to the assistance server 50 via the base station 41 and the network 40.

The assisted GPS position measuring section 61 of the assistance server 50 receives the location information via the transceiving section 52, and transmits the location information to the terminal unit 80 via the transceiving section 52 and the network 40, as well as notifies the location information to the reference position information correction judging section 62. The terminal unit 80 receives the location information being transmitted, and provides it as a location information service to the user of the terminal unit 80. The reference position information correction judging section 62 to which the location information is notified, further notifies this location information to the location information storage section 65, and the location information storage and saving section 65 to which the location information is notified, stores the location information. The location information storage and saving section 65 can hold 100 location information for each cell, as a history, and when there are more than 100 location information, the location information storage-section 65 deletes in order from the oldest information, and stores new location information. Hereafter, the reference position information correction judging section 62 performs the correction judging process 110.

In the correction judging process 110, as shown in FIG. 6, first of all, at step S111, a query of the reference position information of the cell 90 is made to the database section 64, with the cell ID of the cell 90 as a parameter, and that reference position information is acquired. Next, at step S112, when it is confirmed that the reference position information of the cell exists, the process is advanced to step S113, and an error in location information which is notified from the cellular phone 20, is checked.

In this embodiment, the error in the location information means an error which has occurred at the time of the assisted GPS position measuring, and this error in the location information occurs due to a reason such as, a fewer number of GPS satellites could be observed in the GPS observation. When the error in the location information is more than 100 m, at step S119, a judgment that the correction is not to be performed is made, and the correction judging process 110 is terminated. When the error in the location information is not more than 100 m, the process advances to step S114. At step S114, the distance from the reference position information of the cell 90 acquired from the database section 64, and the location information is calculated, and when this distance is less than 300 m, at step S119, a judgment that the correction is not to be performed is made, and the correction judging process 110 is terminated.

On the other hand, when the distance is not less than 300 m, the process is advanced to step S115, and one correction judging counter is added. Next, at step S116, it is checked whether or not the value of the correction judging counter is 10 or more. When the value of the correction judging counter is less than 10, at step S119, a judgment that the correction is not to be performed is made, and the correction judging process 110 is terminated. When the value of the correction judging counter is 10 or more, at step S117, a judgment that the reference position information is to be corrected is made, and the correction judging counter is set to zero.

Next, at step S118, with the location information of the cellular phone 20, and the reference position information of the cell 90, request for correction is made to the reference position information correcting section 63. Coming back to FIG. 7, the reference position information correcting section 63 having received the correction request, acquires all the location information stored in the location information storage and saving section 65 by passing the cell ID as a parameter, and from among this location information, calculates an average location of the location information for which the error is 100 m or less, and as shown in FIG. 4B, lets this location to be the corrected reference position 92. Information of the corrected reference position 92, as shown in FIG. 7, is notified to the database section 64, and is set as the reference position information of the cell 90.

Figure 8:
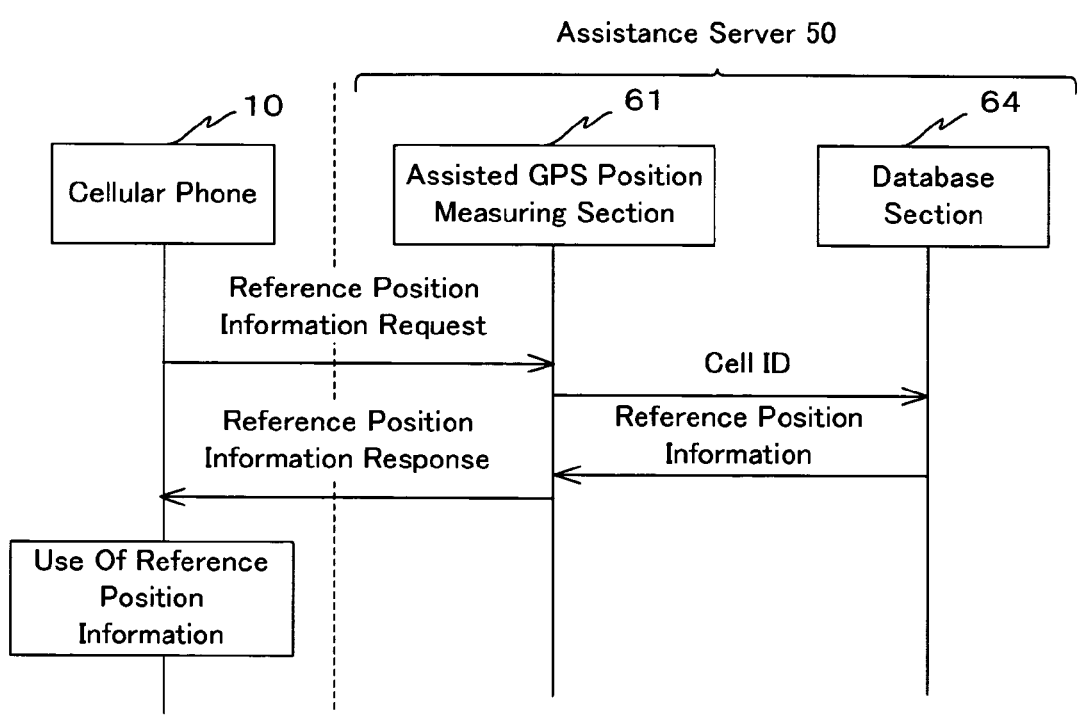
FIG. 8 is a sequence diagram in a case of performing a position measuring by a cell ID.

Note that, an example in which the reference position information is used as a position measuring by the cell ID is shown in FIG. 8. First of all, the cellular phone 10 makes a request for reference position information of a cell in a range, of which the cellular phone 10 exists, to the assistance server 50 via the base station 41 and the network 40. The assisted GPS position measuring section 61 of the assistance server 50 receives the request for the reference position information via the transceiving section 52 and then acquires from the database section 64, the reference position information of the cell with the cell ID of the cell in the range of which the cellular phone 10 exists, as a parameter.

The assisted GPS position measuring section 61, having acquired the reference position information, transmits the reference position information of the cell to the cellular phone 10 via the transceiving section 52, the network 40, and the base station 41. The cellular phone 10 which has received the reference position information, provides it as a location information service to the user.

Figure 9:
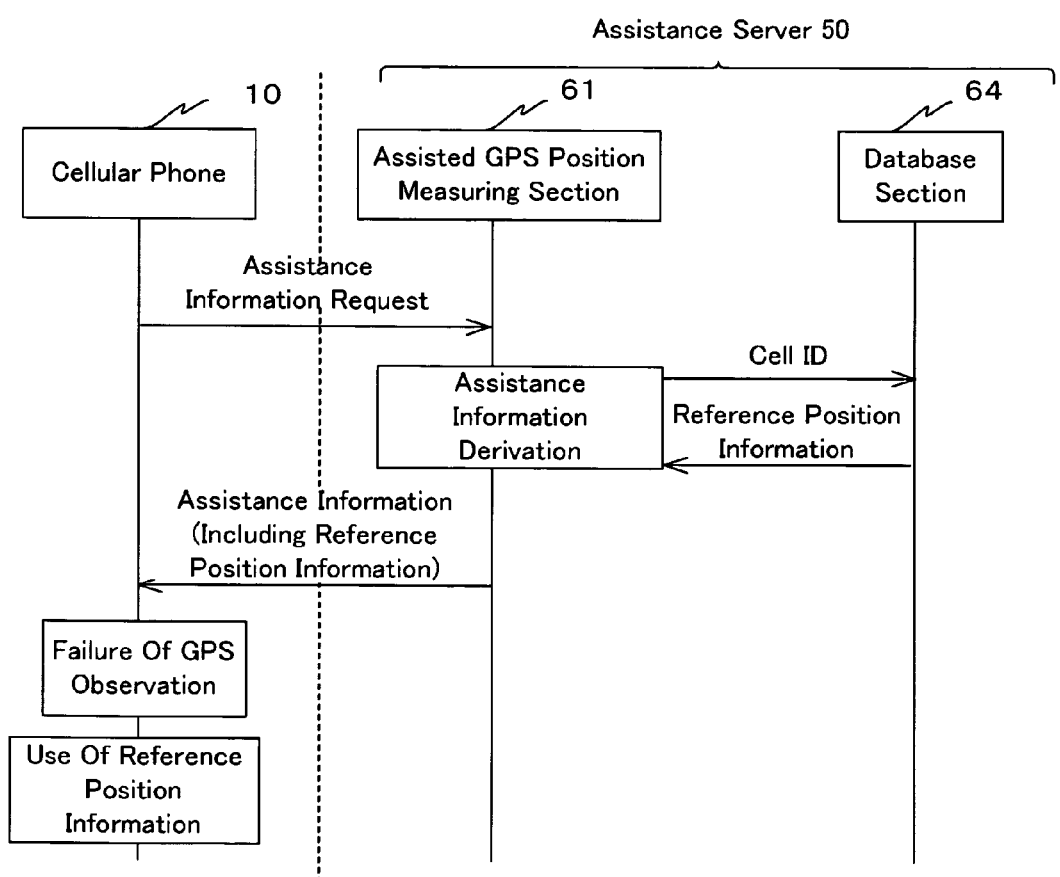
FIG. 9 is a sequence diagram in a case performing a position measuring by a cell ID, as a supplementary position measuring of the assisted GPS position measuring.

Moreover, an example in which a position measuring by a cell ID for supplementing the assisted GPS position measuring is used is shown in FIG. 9. First of all, similarly as in FIG. 5, the cellular phone 10 makes the assistance information request, and the assisted GPS position measuring section 61 acquires the reference position information from the database section 64. Next, the assisted GPS position measuring section 61 transmits the reference position information together with the assistance information, to the cellular phone 10. Further, the cellular phone 10 which has received the assistance information and the reference position information, when fails in making the GPS observation, uses the reference position information as the location information of the cellular phone 10, and provides to the user.

As mentioned above, in this embodiment, in the cell 90, when the cellular phone 10 makes a request for the assistance information, since the reference position information of the cell 90 is not set in the database section 64, the assistance server 50 transmits the assistance information based on the location information of the location area which includes the cell 90. By using this assistance information, the cellular phone 10 performs the GPS observation, and the assistance server 50 which has received the observation result, calculates the location information. The calculated location information is saved in the location information storage section 65, and is set as it is, in the database section 64, as the reference position information of the cell 90.

Moreover, in the terminal unit 80, when the request is made for the location information of the cellular phone 20 which exists in the range of the cell 90, the cellular phone 20 makes a request for the assistance information to the assistance server 50. The assistance server 50 transmits the assistance information to the cellular phone 20, and acquires the location information of the cellular phone 20. The reference position information correction judging section 62 of the assistance server 50 which has acquired the location information, makes a command to save the location information in the location information storage section 65, and makes a judgment that the correction is to be performed. Next, the reference position information correcting section 63 calculates the corrected reference position 92, based on the location information of the cell stored in the location information storage section 65. The corrected reference position 92 which is calculated, is notified to the database section 64, and is set as the reference position information of the cell 90. Moreover, the reference position information which is acquired from the cell ID as it is, can be let to be used by the user as the location information of the mobile communication terminal.

Consequently, according to this embodiment, even in the cell for which the reference position information of the cell is not set, the assisted GPS position measuring can be made possible, and the location information which was obtained from the position measuring, can be added as the reference position information of that cell. Moreover, by performing the GPS position measuring in the cell, the location information is stored, and the stored location information is reflected in the reference position information of the cell. Therefore, it is possible to shorten an average position measuring time of the assisted GPS position measuring, and to reduce an average error in a location of the position measuring in which the cell ID is used.

In this embodiment, the reference position information of the cell 90 is not set initially. However, even when the reference position information of the cell is set initially at a center or other position of the cell, it is possible to apply this embodiment by allowing the reference position 91 shown in FIG. 4B to be an initial reference position.

Moreover, in this embodiment, in the correction judging process, the error in the location information is 100 m or less, the distance from the reference position information is 300 m or more, and furthermore, the correction judging counter is −10 or more. However, other predetermined values may be used, or a judging process by completely different conditions may be performed.

Furthermore, in this embodiment, when the reference position information is not set in the cell, the assistance information request was let to be made from the cellular phone 10 which is subjected to the position measuring, and when the reference position information is set in the cell, the current location information request is let to be made from a terminal other than the cellular phone 20 which is subjected to the position measuring. However, it is needless to mention that when the reference position information of the cell is set, it may be a request for assistance information from a mobile communication terminal which is subjected to the position measuring, and when there is no setting of the reference position information of the cell, it may be a request for current location information from a terminal other than the mobile communication terminal which is subjected to the position measuring.

In this embodiment, the location information storage section 65 stores the location information by saving historically. However, the location information storage section 65 may store for each cell an average value of the location information and only the number of the location information which are used for calculating the average value.

Moreover, in this embodiment, the location information is saved before performing the correction judging process 110. However, the location information may be saved after the correction judging process 110 is performed.

Furthermore, in this embodiment, the request for the position measuring was let to be made (MO-LR) by making the request for the assistance information from the mobile communication terminal that is subjected to the position measuring, in the so-called MS-Assisted mode, which does not perform the calculation of the location by its own. However, the request for the position measuring may be made (MT-LR) by making a request for the location information from a terminal other than the mobile communication terminal which is subjected to the position measuring.

In this embodiment, the position measuring result of the assisted GPS position measuring is the location information of the mobile communication terminal, and is applied to the reference position information correction judging and the reference position information correcting. However, other location information may be applied to the reference position information correction judging and the reference position information correcting.

Moreover, in this embodiment, the assistance server is the same unit as a server unit which is a server system of the present invention. However the assistance server may be a separate server unit.

Furthermore, in this embodiment, the server unit 50 as the server system of the present invention is let to be a single server unit. However, it may be a server system which is formed by a plurality of server units.

In this embodiment, a mobile communication terminal is applied to a cellular phone. However, the presently described mobile communication terminal is applicable to a mobile communication terminal other than the cellular phone.

As it has been described above, a method for correcting reference position information of the present invention is applicable to a server unit performing a management a cell's location information. Moreover, a server system of the present invention is applicable to a server system that performs the management of the location information of the cell. Furthermore, a reference position information correcting system of the present invention is applicable to a mobile communication system which includes the server unit performing the management of the location information of the cell.

What is claimed is:

1. A method for correcting reference position information of a cell, said method being performed by a server system, said cell being in an area in which a base station can perform a wireless communication with a mobile communication terminal, comprising steps of:
   storing, in said server system, current location information of the mobile communication terminal;
   identifying said cell in dependence upon said current location information, wherein the mobile communication terminal currently exists in said cell;
   identifying an error in said current location information;
   judging whether said reference position information of the cell is to be corrected based on the current location information; and
   when a judgment at the step of judging whether the reference position information of the cell is to be corrected is affirmative, correcting the reference position information of the cell based on at least one location information that is stored at the step of storing said current location information;
   wherein a judgment at the step of judging whether the reference position information of the cell is to be corrected is affirmative when:
      the error in the current location information is not more than a predetermined value,
      a distance from a location of the reference position information of the cell to a location corresponding to the current location information is not less than a predetermined distance, and
      the current location information is acquired at least a predetermined number of times;
   wherein the predetermined value is less than the predetermined distance.

2. A method for correcting or setting reference position information of a cell, said method being performed by a server system, said cell being in an area in which a base station can perform a wireless communication with a mobile communication terminal, comprising steps of:
   storing, in said server system, current location information of the mobile communication terminal;
   identifying said cell in dependence upon said current location information, wherein the mobile communication terminal currently exists in said cell;
   identifying an error in said current location information;
   when reference position information of said cell is available, judging whether the reference position information of the cell is to be corrected based on the current location information;
   when a judgment at the step of judging whether the reference position information of the cell is to be corrected is affirmative, correcting the reference position information of the cell based on at least one location information that is stored at the step of storing said current location information;
   wherein a judgment at the step of judging whether the reference position information of the cell is to be corrected is affirmative when:
      an error in the current location information is not more than a predetermined value,
      a distance from a location of the reference position information of the cell to a location corresponding to the current location information is not less than a predetermined distance, and
      the current location information is acquired at least a predetermined number of times;
   wherein the predetermined value is less than the predetermined distance;
   when the reference position information of the cell is not available, setting the reference position information of the cell to be the current location information.

3. The method for correcting reference position information according to claim 1, wherein
   the current location information is a position measuring result of an assisted GPS position measuring in which assistance information, which includes information for capturing a GPS satellite signal, is used.

4. A server system comprising:
   a database which includes reference position information of a cell, said cell being in an area in which a base station can perform a wireless communication with a mobile communication terminal;
   a location information storage section that is configured to store current location information of a mobile communication terminal, wherein said a cell can be identified in dependence upon the current location information, said cell being in an area where the mobile communication terminal exists;

a reference position information correction judging section that is configured to acquire the current location information, is configured to make a judgment of whether to correct the reference position information of the cell when the reference position information of the cell is available, and is configured to make a judgment of whether to set the reference position information of the cell when there is no reference position information of the cell in the database; and a reference position information correcting section that is configured to correct the reference position information of the cell, when conditions (I)-(VI) are satisfied:

(I) the reference position information correction judging section has made an affirmative judgment to correct the reference position information, (II) the reference position information of the cell is available, (III) a detected error in the current location information is not more than a predetermined value, (IV) a distance from a location of the reference position information of the cell to a location corresponding to the current location information is not less than a predetermined distance, (V) the current location information is acquired at least a predetermined number of times, and (VI) the predetermined value is less than the predetermined distance;

wherein the reference position information correction judging section is configured to make an affirmative judgment to set the reference position information, when there is no reference position information of the cell in the database;

wherein the reference position information correcting section is configured to make a judgment to set the reference position information of the cell to be the current location information, when there is no reference position information of the range cell in the database.

5. The server system according to claim 4, wherein the server system is an assistance server that is configured to provide assistance information, including the information for capturing a GPS satellite signal, to a mobile communication terminal that makes a request for acquiring the assistance information.

6. A reference position information correcting system comprising:

mobile communication terminal;

a network to which the mobile communication terminal is connected by using a wireless network; and the server system according to claim 4, which is connected to the network.

* * * * *